United States Patent
Lee et al.

(10) Patent No.: US 8,909,228 B2
(45) Date of Patent: Dec. 9, 2014

(54) APPARATUS AND METHOD FOR REPORTING MEASUREMENT RESULT IN WIRELESS COMMUNICATION SYSTEM

(75) Inventors: Sung Min Lee, Gyeongki-do (KR);
Sung Jun Park, Gyeongki-do (KR);
Sung Hoon Jung, Gyeongki-do (KR);
Sung Duck Chun, Gyeongki-do (KR);
Seung June Yi, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 399 days.

(21) Appl. No.: 12/917,900

(22) Filed: Nov. 2, 2010

(65) Prior Publication Data

US 2011/0105123 A1    May 5, 2011

Related U.S. Application Data

(60) Provisional application No. 61/257,809, filed on Nov. 3, 2009, provisional application No. 61/293,185, filed on Jan. 7, 2010.

(30) Foreign Application Priority Data

Oct. 20, 2010 (KR) .................. 10-2010-0102300

(51) Int. Cl.
*H04W 36/00* (2009.01)
*H04W 4/00* (2009.01)
*H04W 24/10* (2009.01)
*H04W 84/04* (2009.01)
*H04W 36/04* (2009.01)

(52) U.S. Cl.
CPC ............ *H04W 24/10* (2013.01); *H04W 84/045* (2013.01); *H04W 36/04* (2013.01)
USPC .......................................... 455/436; 370/328

(58) Field of Classification Search
USPC .......................................... 455/436; 370/328
See application file for complete search history.

(56) References Cited

U.S. PATENT DOCUMENTS

| | | |
|---|---|---|
| 2009/0047960 A1* | 2/2009 | Gunnarsson et al. ......... 455/436 |
| 2009/0238117 A1* | 9/2009 | Somasundaram et al. .... 370/328 |
| 2011/0069658 A1* | 3/2011 | Tiwari ........................... 370/328 |
| 2012/0244903 A1* | 9/2012 | Fong et al. .................... 455/517 |

* cited by examiner

*Primary Examiner* — Vladimir Magloire
*Assistant Examiner* — Natasha Cosme
(74) *Attorney, Agent, or Firm* — Morgan, Lewis & Bockius LLP

(57) ABSTRACT

A method and apparatus of reporting a measurement result in a wireless communication system is provided. An user equipment receives a measurement parameter for measurement of a closed subscriber group (CSG) cell and measures signal quality of at least one CSG cell on the basis of the measurement parameter. The user equipment determines at least one CSG cell's CSG identity (ID) by using system information of the at least one CSG cell and determines at least one member CSG cell having the user equipment as a member thereof from the at least one CSG cell on the basis of the at least one CSG cell's CSG ID. The user equipment selects a member CSG cell to send a measurement report from the at least one member CSG cell, and transmits the measurement report comprising signal quality for the selected member CSG cell.

10 Claims, 14 Drawing Sheets

APPARATUS AND METHOD FOR REPORTING MEASUREMENT RESULT IN WIRELESS COMMUNICATION SYSTEM

CROSS-REFERENCE TO RELATED APPLICATIONS

This application claims the benefit of priority of U.S. Provisional applications 61/257,809 filed on Nov. 3, 2009, 61/293,185 filed on Jan. 7, 2010, and Korean Patent Application No. 10-2010-0102300 filed on Oct. 20, 2010, all of which are incorporated by reference in their entirety herein.

BACKGROUND OF THE INVENTION

1. Field of the Invention

The present invention relates to wireless communications, and more particularly, to a method and apparatus for reporting a measurement result in a wireless communication system.

2. Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

A closed subscriber group (CSG) is introduced to provide a better quality of service by allowing limited access only to a particular subscriber. A base station capable of providing a CSG service is referred to as a home eNodeB (HNB), and a cell providing a licensed service to subscribers of the CSG is referred to as a CSG cell. Basic requirements of the CSG in 3GPP are disclosed in 3GPP TS 22.220 V1.0.1 (2008-12) "Service requirements for Home NodeBs and Home eNodeBs (Release 9)".

The CSG cell has a cell size (i.e., a size of coverage provided by the cell) smaller than a normal cell. Even though various-sized cells coexist, when a handover is performed or a measurement result is reported according to the conventional method, a user equipment may perform an unnecessary handover.

SUMMARY OF THE INVENTION

The present invention provides a method and apparatus for reporting a measurement result by considering a closed subscribed group (CSG) cell.

The present invention also provides a method and apparatus for performing a handover by considering a CSG cell.

In an aspect, a method of reporting a measurement result of a user equipment in a wireless communication system is provided. The method includes receiving, from a serving cell, a measurement parameter for measurement of a closed subscriber group (CSG) cell, measuring signal quality of at least one CSG cell on the basis of the measurement parameter, determining at least one CSG cell's CSG identity (ID) by using system information of the at least one CSG cell, determining at least one member CSG cell having the user equipment as a member thereof from the at least one CSG cell on the basis of the at least one CSG cell's CSG ID, selecting a member CSG cell to send a measurement report from the at least one member CSG cell, and transmitting, to the serving cell, the measurement report comprising signal quality for the selected member CSG cell.

The method may further include receiving a preliminary report request for requesting acquisition of the system information from the serving cell.

The measurement report may include a cell ID of the selected member CSG cell.

The step of selecting of the member CSG cell may include selecting a member CSG cell having best signal quality from the at least one member CSG cell.

The measurement report may include a CSG ID of the selected member CSG cell.

In another aspect, a user equipment for reporting a measurement result in a wireless communication system is provided. The user equipment includes a radio frequency (RF) unit for transmitting and receiving a radio signal, and a processor coupled to the RF unit and configured for receiving, from a serving cell, a measurement parameter for measurement of a closed subscriber group (CSG) cell, measuring signal quality of at least one CSG cell on the basis of the measurement parameter, determining at least one CSG cell's CSG identity (ID) by using system information of the at least one CSG cell, determining at least one member CSG cell having the user equipment as a member thereof from the at least one CSG cell on the basis of the at least one CSG cell's CSG ID, selecting a member CSG cell to send a measurement report from the at least one member CSG cell, and transmitting, to the serving cell, the measurement report comprising signal quality for the selected member CSG cell.

A handover failure rate can be reduced even if a user equipment enters a region where a micro cell and a macro cell coexist.

DESCRIPTION OF EXEMPLARY EMBODIMENTS

Figure 1:
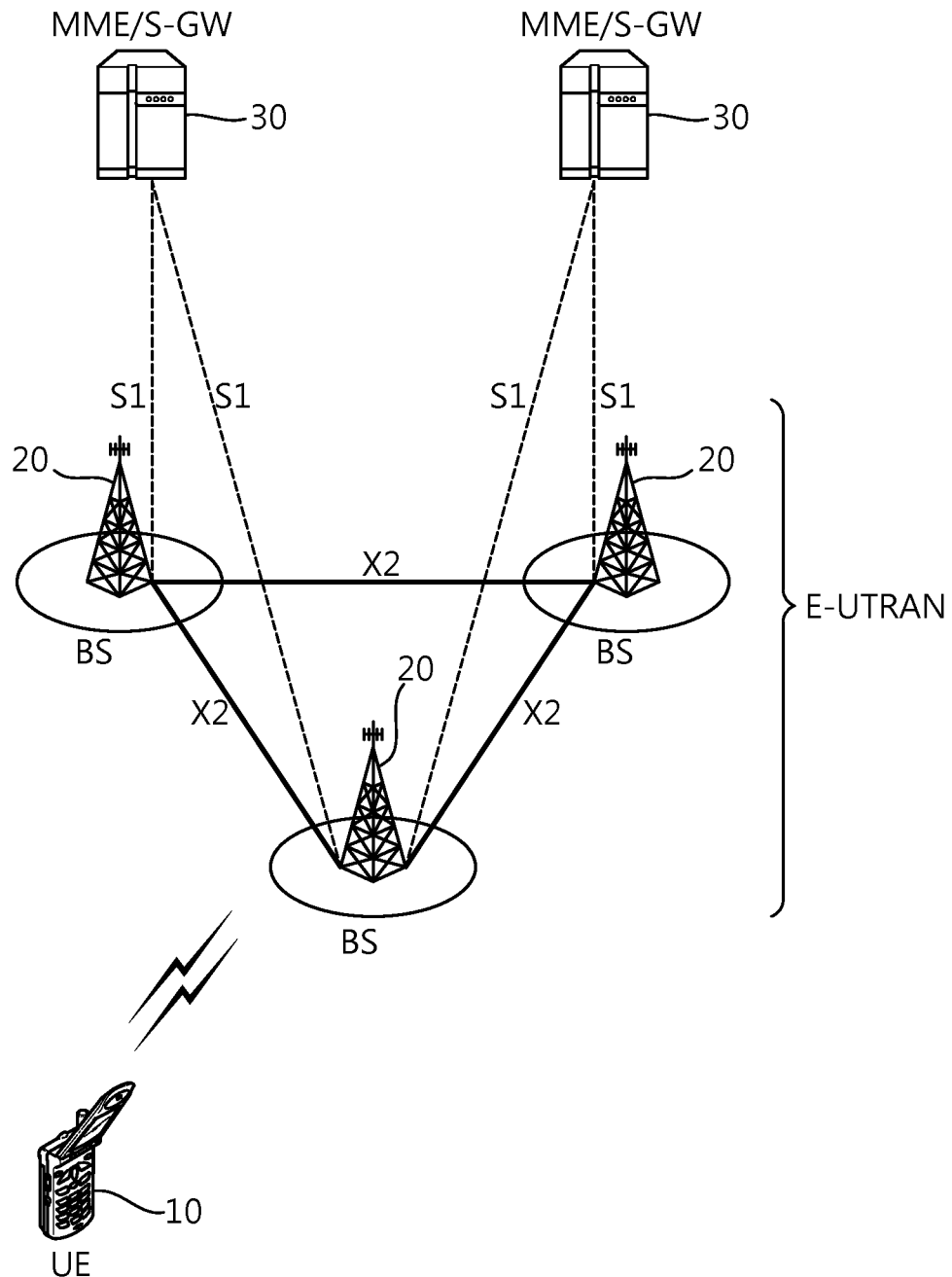
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
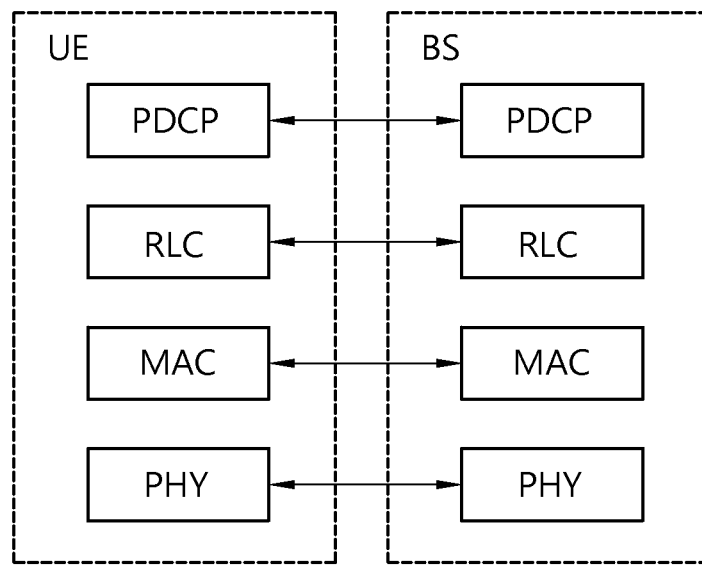
FIG. 2 is a diagram showing a radio protocol architecture for a user plane.
Figure 3:
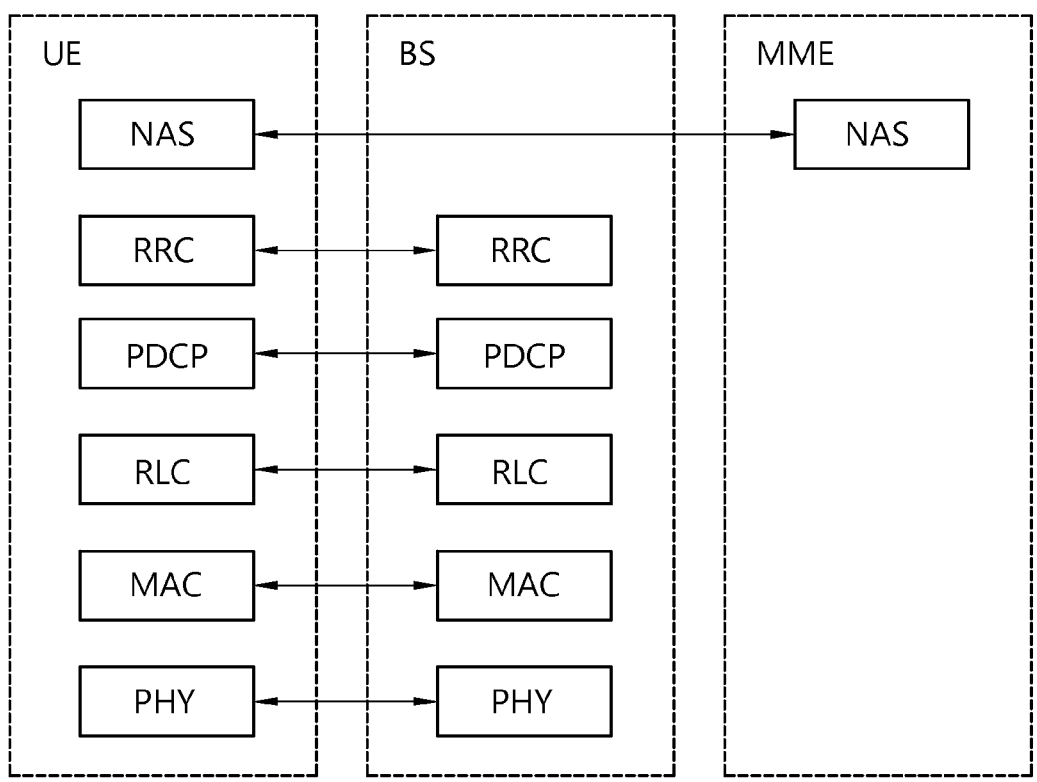
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection mechanism will be described.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be described.

The system information includes essential information that must be known to a UE to access a BS. Thus, the UE has to receive all of the system information before accessing the BS. Further, the UE must always have the latest system information. Since the system information is information that must be known to all UEs in one cell, the BS periodically transmits the system information.

According to the section 5.2.2 of 3GPP TS 36.331 V8.4.0 (2008-12) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a particular cell. The SB reports transmission information (e.g., a transmission period or the like) of SIBs. The SIB is a group of a plurality of pieces of system information related to each other. For example, an SIB includes only information of a neighbor cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

The service type provided by a cell can be classified as follows.

1) Acceptable cell: This cell serves a UE with a limited service. This cell is not barred from the perspective of the UE, and satisfies a cell selection criterion of the UE.

2) Suitable cell: This cell serves a UE with a regular service. This cell satisfies a condition of the acceptable cell, and also satisfies additional conditions. Regarding the additional conditions, this cell has to belong to a PLMN to which the UE can access, and a tracking area update procedure of the UE must not be barred in this cell. If the corresponding cell is a CSG cell, this cell must be accessible by the UE as a CSG member.

3) Barred cell: Information indicating that a cell is a barred cell is broadcast in this cell by using the system information.

4) Reserved cell: Information indicating that a cell is a reserved cell is broadcast in this cell by using the system information.

Figure 4:
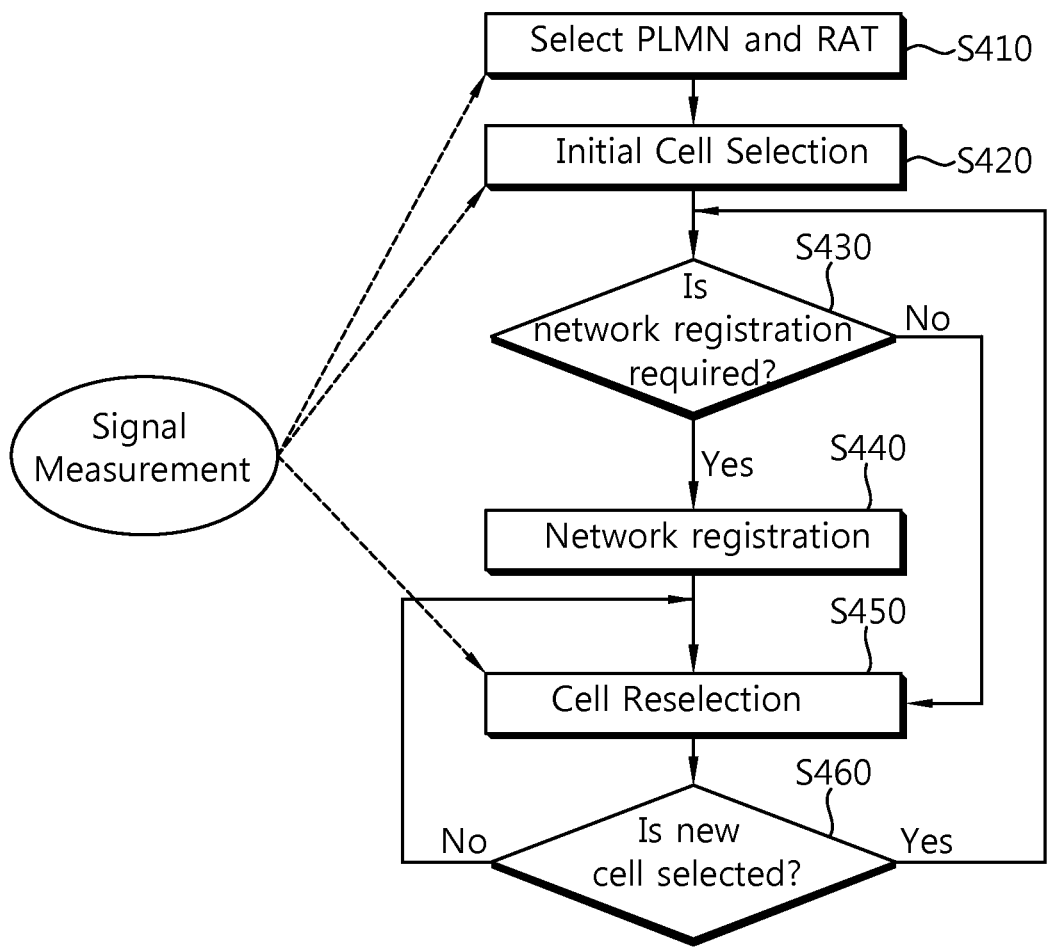
FIG. 4 is a flowchart showing a cell selection procedure of a user equipment (UE) in an idle mode.

FIG. 4 is a flowchart showing a cell selection procedure of a UE in an idle mode.

The UE selects a public land mobile network (PLMN) and a radio access technology (RAT) to receive a service (step S410). The PLMN and the RAT may be selected by a user of the UE, and data stored in a universal subscriber identity module (USIM) may also be used.

Among cells of which signal strength or quality measured from a BS is greater than a particular value, the UE selects a cell having a greatest value (step S420). Then, the UE receives system information periodically sent by the BS. The particular value is a value defined in a system to guarantee quality of a physical signal in data transmission/reception. Accordingly, the value may vary depending on the RAT in use.

If network registration is required, the UE registers its own information (for example, IMSI) for receiving a service (for example, paging) from a network (steps S430 and S440). The network registration is not performed whenever the UE selects a cell. For example, the network registration is performed when system information (for example, Tracking Area Identity (TAI)) of the network to be registered is different from network information known to the UE.

If a value of the signal strength or quality measured from the BS which provides a service to the UE is less than a value measured from a BS in a neighboring cell, the UE selects one of other cells providing a better signal property than that of a cell of the BS currently accessed by the UE (step S450). This process is referred to as cell reselection to distinguish it from initial cell selection of the step S420. In this case, the cell reselection may occur frequently according to changes in the signal property, and to prevent this, time constraints may be given.

Next, a procedure for selecting a cell by the UE will be described in detail.

If the UE is turned on or is camped on a cell, the UE may perform procedures for selecting/reselecting a cell having suitable quality in order to receive a service.

The UE in an RRC idle state needs to select the cell having suitable quality all the time, and thus be prepared to receive the service through the cell. For example, the UE that has been just turned on must select the cell having suitable quality so as to be registered into a network. If the UE that has stayed in an RRC connected state enters into an RRC idle state, the UE must select a cell on which the UE itself is camped. In this manner, a process of selecting a cell satisfying a certain condition by the UE in order to stay in a service waiting state such as the RRC idle state is called cell selection. The cell selection is performed in a state that the UE does not currently determine a cell on which the UE itself is camped in the RRC idle state, and thus it is very important to select the cell as quickly as possible. Therefore, if a cell provides radio signal quality greater than or equal to a predetermined level, the cell may be selected in the cell selection process of the UE even though the cell is not a cell providing best radio signal quality.

Hereinafter, by referring to the 3GPP TS 36.304 V8.3.0 (2008-09) "User Equipment (UE) procedures in idle mode (Release 8)", a method and procedure for selecting a cell by a UE will be described in detail.

If power is initially turned on, the UE searches for available PLMNs and selects a suitable PLMN to receive a service. Subsequently, the UE selects a cell having a signal quality and property capable of receiving a suitable service among the cells provided by the selected PLMN.

The cell selection process can be classified into two processes.

One process is an initial cell selection process, and in this process, the UE does not have previous information on radio channels. Therefore, the UE searches for all radio channels to find a suitable cell. In each channel, the UE searches for the strongest cell. Subsequently, if a suitable cell satisfying cell selection criteria is found, the UE selects the cell.

The other process is a cell selection process using stored information, and in this process, the UE uses radio channel information stored in the UE, or selects a cell by using information being broadcasted from the cell. Accordingly, a cell may be quickly selected compared to the initial cell selection process. If a cell satisfying the cell selection criteria is found, the UE selects the cell. If the cell satisfying the cell selection criteria is not found, the UE performs the initial cell selection process.

The cell selection criteria used by the UE in the cell selection process may be represented by Equation 1 as shown:

$$Srxlev > 0 \quad \text{[Equation 1]}$$

where Srxlev=Qrxlevmeas−(Qrxlevmin+Qrxlevminoffset)−Pcompensation. Qrxlevmeas denotes a measured cell received level (i.e., reference signal received power (RSRP)), Qrxlevmin denotes a minimum required received level (dBm) in the cell, Qrxlevminoffset denotes a offset to Qrxlevmin, Pcompensation is max(PEMAX−PUMAX, 0) (dB), PEMAX denotes maximum transmission power (dBm) allowed for the UE in the corresponding cell, and PUMAX denotes maximum transmission power (dBm) for a radio frequency (RF) transmission unit of the UE and based on performance of the UE.

In the above Equation 1, it can be seen that the UE selects a cell having signal strength and quality greater than a particular value specified in the cell providing the service. Further, the parameters used in the above Equation 1 are broadcast by using the system information, and the UE receives those parameter values to use them for the cell selection criteria.

If the UE selects a cell satisfying the cell selection criteria, the UE receives information required for an RRC idle mode operation of the UE in the corresponding cell from the system information of the corresponding cell. The UE receives all the information required for the RRC idle mode operation, and then waits in an idle mode to request a service (for example, originating call) to a network or receive a service (for example, terminating call) from the network.

After the UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called cell reselection. A basic object of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority in the first place than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The principles of the cell reselection process are as follows.

First, the UE measures quality of a serving cell and a neighboring cell for cell reselection.

Second, the cell reselection is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having a top priority. The network may provide the same frequency priority to be commonly applied to UEs in a cell by using broadcast signaling or may provide a frequency-specific priority to each UE by using dedicated signaling for each UE.

For the inter-frequency cell reselection, the network may provide parameters (e.g., frequency-specific offsets) for use in cell reselection to the UE for each frequency. For the intra-frequency cell reselection or the inter-frequency cell reselection, the network may provide a neighboring cell list (NCL) for use in the cell reselection to the UE. The NCL includes cell-specific parameters (e.g. cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Now, the ranking used in a cell reselection evaluation process will be described.

A ranking criterion used to assign a priority to a cell is defined by Equation 2 as shown:

[Equation 2]

$$Rs = Q\text{meas},s + Q\text{hyst}, Rn = Q\text{meas},n - Q\text{offset}$$

where Rs denotes a ranking value of a serving cell, Rn denotes a ranking criterion of a neighboring cell, Qmeas,s denotes a quality value measured for the serving cell by the UE, Qmeas,n denotes a quality value measured for the neighboring cell by the UE, Qhyst denotes a hysteresis value for ranking, and Qoffset denotes an offset between two cells.

In the intra-frequency cell reselection, if the UE receives an offset Qoffsets,n between the serving cell and the neighboring cell, Qffoset=Qoffsets,n. Otherwise, Qffoset=0.

In the inter-frequency cell reselection, if the UE receives the offset Qoffsets,n, Qoffset=Qoffsets,n+Qfrequency. Otherwise, Qoffset=Qfrequency.

If the ranking criterion Rs of the serving cell and the ranging criterion Rn of the neighboring cell are not much different from each other and constantly vary, ranking orders of the serving cell and the neighboring cell may change frequently. Thus, the serving cell and the neighboring cell may be reselected alternately while changing their ranking orders too often. In order to prevent the UE from reselecting two cells alternately, the hysteresis value Qhyst is used to give a hysteresis in the cell reselection.

The UE measures the ranking criterion Rs of the serving cell and the ranking criterion Rn of the neighboring cell according to the above equation. A cell having the greatest ranking criterion value is reselected by considering this cell as a best-ranked cell.

In the above-mentioned cell reselection criterion, the quality of cells is considered as most important factor when performing the cell reselection. If a reselected cell is not a suitable cell, the UE excludes the reselected cell or a frequency of the reselected cell from targets of the cell reselection.

Now, speed scaling having an effect on cell reselection according to a UE speed will be described.

When a UE passes cells with a fast speed, the cell reselection may not be achieved correctly and the UE may not be able to camp on a particular cell. Such a problem occurs due to a reselection time, i.e., Treselection, for preventing unnecessary occurrence of the cell reselection.

The cell reselection is performed when neighboring cell signal strength measured by the UE during the Treselection is greater than a particular value. In this case, if the UE moves at a fast speed, there may be a case where a cell reselection condition cannot be satisfied with the existing Treselection. Therefore, along with the change of the UE speed, the Treselection may be adjusted to a smaller value to satisfy the cell reselection condition even if the UE moves fast, and this is referred to as speed scaling. The change of the UE speed is determined by comparing the number of cell reselections performed during a specific time with a particular value.

Hereinafter, a closed subscriber group (CSG) will be described.

A BS which provides a CSG service is called a home node B (HNB) or home eNB (HeNB) in 3GPP. Hereinafter, both the HNB and HeNB are collectively referred to as the HNB. The HNB is basically used to provide specialized services only to members of the CSG. However, according to operation mode setting of the NHB, the services may also be provided to other users in addition to the users of the CSG.

Figure 5:
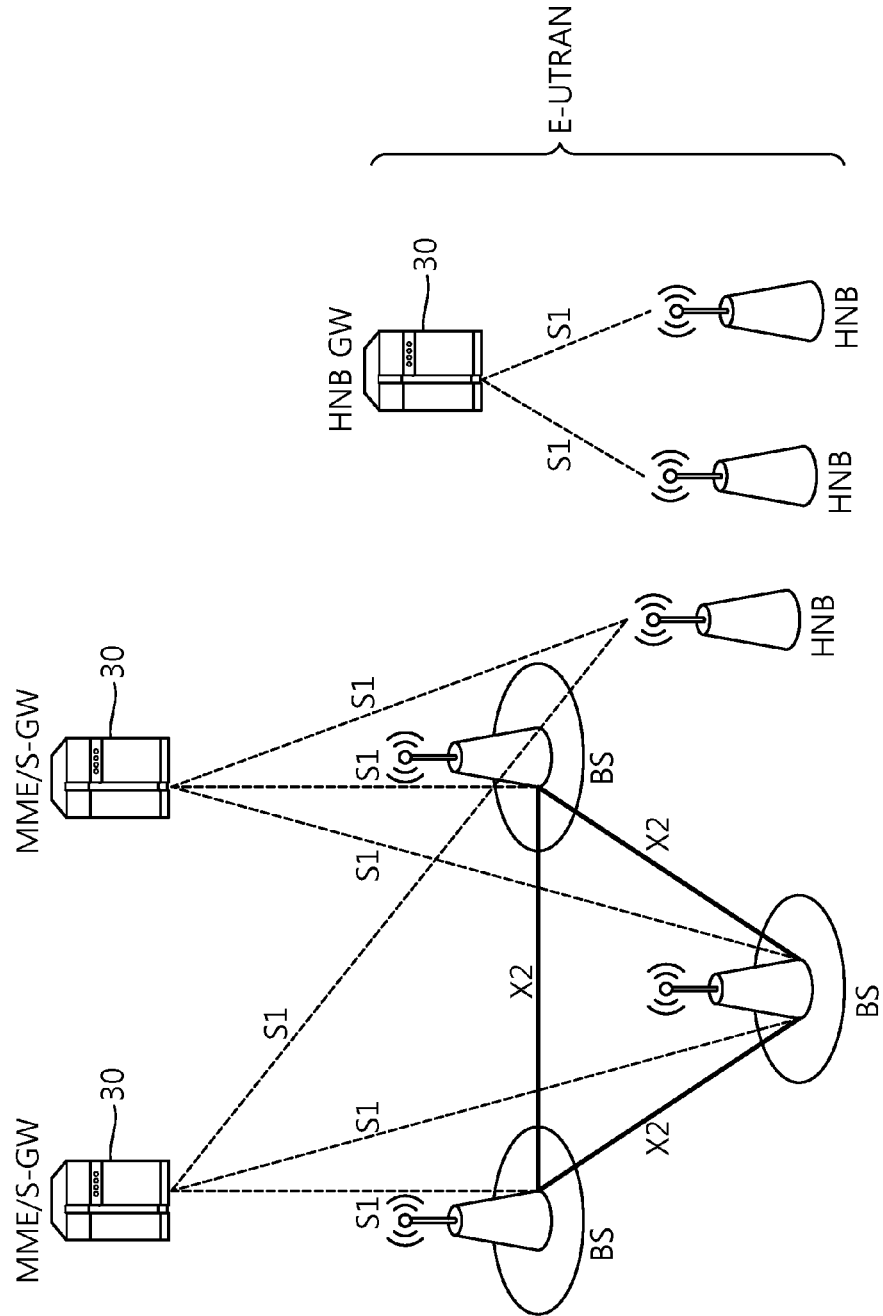
FIG. 5 is an exemplary view showing a network architecture for managing a home node B (HNB) by using an HNB gateway (GW).

FIG. 5 is an exemplary view showing a network architecture for managing an HNB by using an HNB gateway (GW).

HNBs are connected to an EPC directly or via the HNB GW. Herein, an MME regards the HNB GW as a typical BS. Further, the HNB regards the HNB GW as the MME. Therefore, the HNB and the HNB GW are connected by means of an S1 interface, and also the HNB GW and the EPC are connected by means of the S1 interface. Furthermore, even in a case where the HNB and the EPC are directly connected, they are connected by means of the S1 interface. A function of the HNB is almost similar to a function of the typical BS.

In general, the HNB has radio transmission output power lower than that of a BS owned by a mobile communication service provider. Therefore, in general, the coverage provided by the HNB is smaller than the coverage provided by the BS. Due to such characteristics, a cell provided by the HNB is often classified as a femto cell in contrast to a macro cell provided by the BS from the perspective of the coverage.

From the perspective of provided services, when the HNB provides the services only to the CSG group, a cell provided by this HNB is referred to as a CSG cell.

Each CSG has its own identity which is called a CSG identity (CSG ID). The UE may have a list of CSGs to which the UE belongs as a member thereof, and this CSG list may change by a request of the UE or by a command of the network. In the current specification of the 3GPP, one HNB can support one CSG.

The UE has the list of CSGs to which the UE belongs as a member thereof. This list is called as a CSG white list.

The HNB delivers the CSG ID of the CSG supported by the HNB itself by using system information, so as to allow access of only a member UE of the corresponding CSG. When the CSG cell is found, the UE may read the CSG ID included in the system information to determine which CSG is supported by the CSG cell. The UE that has read the CSG ID regards the corresponding cell as an accessible cell only if the UE itself is a member of the corresponding CSG cell, that is, if the CSG corresponding to the CSG ID is included in the CSG white list of the UE.

It is not always required for the HNB to allow access of the CSG UE. Based on the configuration setting of the HNB, access of a non-CSG member UE may also be allowed. According to the configuration setting of the HNB, access is allowed for a different UE. Herein, the configuration setting denotes setting of an operation mode of the HNB. The operation mode of the HNB is classified into three modes described below, depending on a type of UE for which a service is provided.

1) Closed access mode: A mode in which services are provided to particular CSG members only. The HNB provides a CSG cell.

2) Open access mode: A mode in which services are provided without any restriction of particular CSG members, similarly to the typical BS. The HNB provides a typical cell instead of a CSG cell.

3) Hybrid access mode: A mode in which CSG services are provided to particular CSG members and also services are provided to non-CSG members, similarly to a typical cell. It is recognized as a CSG cell for the CSG member UE, and recognized as a typical cell for the non-CSG member UE. This cell is called a hybrid cell.

The HNB notifies the UE whether a cell serviced by the HNB is a CSG cell or a typical cell, and thus allows the UE to know whether the UE can access to the cell. When operating in the closed access mode, the HNB broadcasts that the cell serviced by the HNB is the CSG cell by using system information. When operating in the open access mode, the HNB broadcasts that the cell serviced by the HNB is not the CSG cell by using the system information. In this manner, the HNB inserts a CSG indicator into the system information, wherein the CSG indicator indicates whether the cell being serviced by the HNB is the CSG cell or not.

For example, the CSG cell broadcasts the CSG indicator by setting it to 'TRUE'. If the cell being serviced is not the CSG cell, a method of setting the CSG indicator to 'FALSE' or omitting transmission of the CSG indicator may be used. Since the UE has to distinguish the CSG cell from the typical cell, the typical BS may also transmit the CSG indicator (for example, the CSG indicator set to 'FALSE') so as to allow the UE to know that the cell type provided by the BS is the typical cell. Furthermore, the typical BS may allow the UE to know that the cell type provided by the BS is the typical cell by not transmitting the CSG indicator.

The CSG-related parameters transmitted by the corresponding cell for each cell type are represented in Table 1. The CSG-related parameters may be transmitted by using the system information.

TABLE 1

| | CSG Cell | Typical Cell |
|---|---|---|
| CSG Indicator | 'CSG Cell' is indicated | 'Non-CSG cell' is indicated, or not transmitted |
| CSG ID | Supported CSG ID is transmitted | Not transmitted |

A type of UE for which access is accepted is represented in Table 2.

TABLE 2

| | CSG Cell | Typical Cell |
|---|---|---|
| UE not supporting CSG | Access denied | Access accepted |
| Non-CSG member UE | Access denied | Access accepted |
| CSG member UE | Access accepted | Access accepted |

Figure 6:
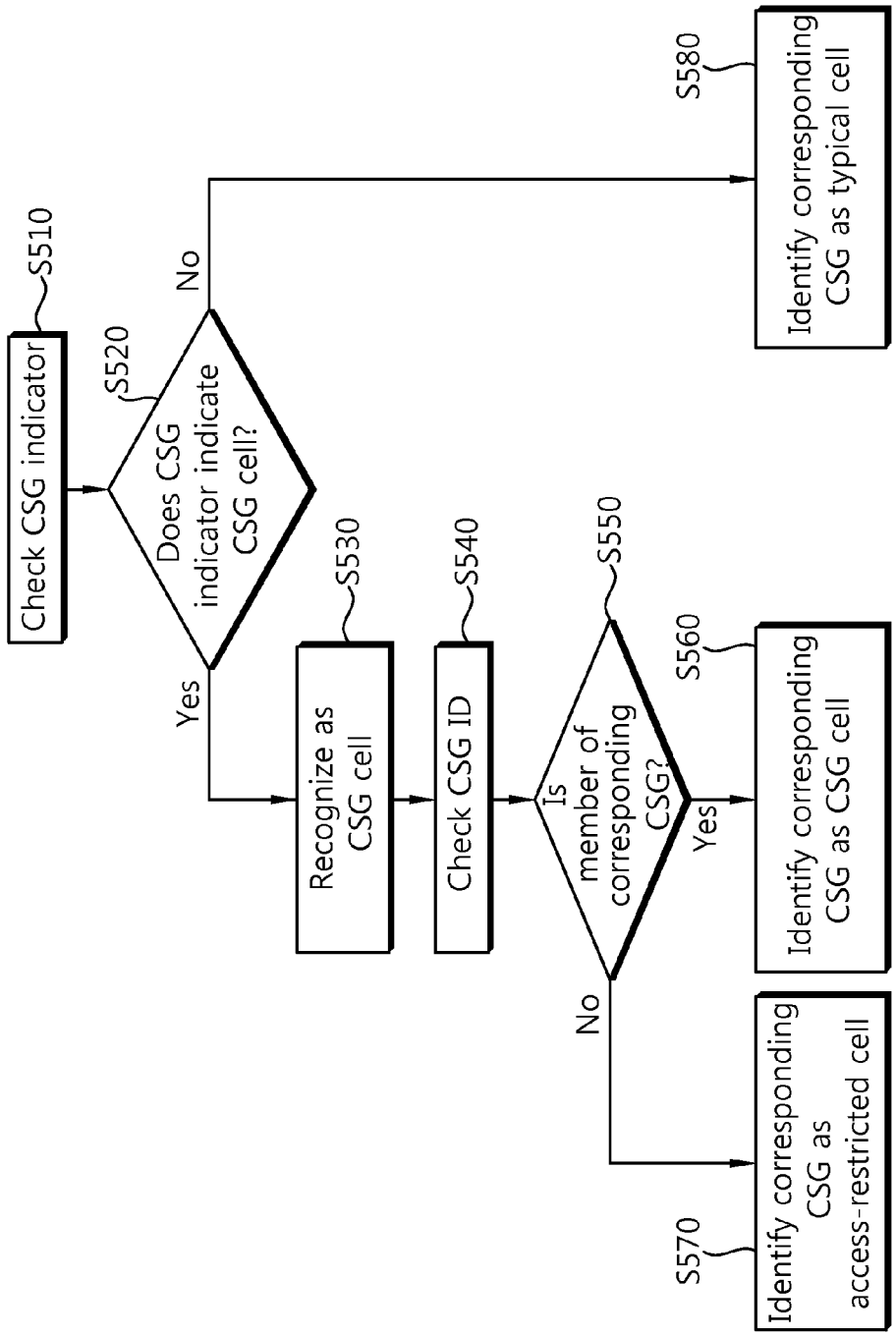
FIG. 6 is a flowchart showing a method of checking for an access mode of a base station (BS) by a UE.

FIG. 6 is a flowchart showing a method of checking for an access mode of a BS by a UE.

The UE checks for a CSG indicator existing in system information of a target cell in order to determine a type of the target cell (step S510).

After checking for the CSG indicator, if the CSG indicator indicates that the target cell is a CSG cell, the UE recognizes the cell as the CSG cell (steps S520 and S530). Thereafter, the UE checks for a CSG ID existing in the system information in order to determine whether the UE itself is a CSG member of the target cell (step S540).

If the UE determines that the UE is the CSG member of its target cell by using the CSG ID, the cell is recognized as an accessible CSG cell (steps S550 and S560). If the UE determines that the UE is not the CSG member of its target cell by using the CSG ID, the cell is recognized as an access-restricted CSG cell (steps S550 and S570).

If the CSG indicator indicates that the target cell is not the CSG in the step S520, the UE recognizes the target cell as a typical cell (steps S520 and S580). Furthermore, if the CSG indicator is not transmitted in the step S510, the UE recognizes the target cell as the typical cell.

In general, CSG cells and macro cells may be concurrently managed at a particular frequency. A CSG dedicated frequency is a frequency at which only the CSG cells exist. A mixed carrier frequency is a frequency at which both the CSG cells and the macro cells exist. The network may reserve a physical layer cell identity for the CSG cell at the mixed carrier frequency.

The physical layer cell identity is called a physical cell identity (PCI) in E-UTRAN and is called a physical scrambling code (PSC) in UTRAN. For clarity, the physical layer cell identity will be expressed by the PCI.

The CSG cell notifies information on the PCI reserved for the CSG cell at a current frequency by using the system information. The UE that has received this information can determine whether or not this cell is a CSG cell from the PCI of the cell when a certain cell is found at the corresponding frequency. The information is utilized by the UE as described below, which will be explained by taking two types of UEs for example.

First, in case of a UE, not supporting the CSG-related function or having no CSG list to which the UE itself belongs, the UE does not need to regard a CSG cell as a selectable cell during a cell selection/reselection process. In this case, the UE checks for only the PCI of the cell, and may immediately excludes the corresponding cell in the cell selection/reselection process if the PCI is a reserved PCI for the CSG. In general, the PCI of a certain cell can be immediately known during a process of checking for the existence of the corresponding cell in a physical layer by the UE.

Second, in case of a UE having a CSG list to which the UE itself belongs, when the UE wants to know a list of neighboring CSG cells at a mixed carrier frequency, it may be known that the corresponding cell is a CSG cell if only a cell having the PCI reserved for CSG is found, instead of individually checking for the CSG ID of the system information for every cell found in the whole PCI range.

Now, a cell reselection process related to a CSG cell will be described.

The CSG cell is a cell for providing better-quality CSG services to its member UE. Therefore, when the UE is camped on the CSG cell, inter-frequency cell reselection may not be appropriate in terms of QoS even if the UE finds an inter-frequency having a higher priority than a frequency priority of a serving frequency.

When the UE is camped on the CSG cell, in order to prevent an inter-frequency cell having a higher priority than the serving frequency from being selected in cell reselection, if a CSG cell of a certain frequency is determined as a best-ranked cell according to a cell reselection evaluation criterion at that frequency, the UE assumes that a frequency priority of the corresponding frequency is higher than other frequencies.

When a frequency priority higher than that assignable by the network is assigned by the UE to a particular frequency, such a frequency priority is called an 'implicit highest priority'. In doing so, it is possible to help the UE to camp on the CSG cell without violation of the existing cell selection rule in which the frequency priority is first considered when the UE performs the cell reselection.

Figure 7:
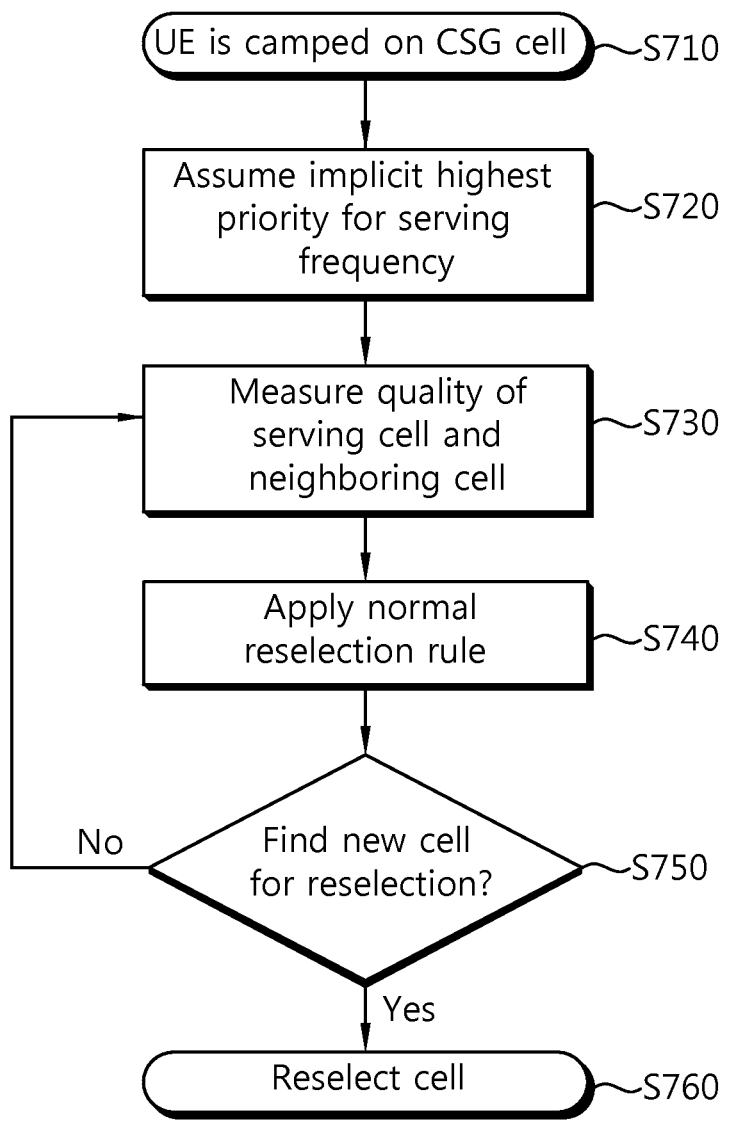
FIG. 7 is a flowchart showing an example of cell reselection when a UE is camped on a closed subscribed group (CSG) cell.

FIG. 7 is a flowchart showing an example of cell reselection when a UE is camped on a CSG cell.

The UE is camped on the CSG cell (step S710).

Since a serving cell of the UE is the CSG cell, an implicit highest priority is assigned to a serving frequency (step S720).

The UE measures quality of the serving CSG cell and a neighboring cell (step S730).

The UE applies a normal reselection rule based on the measurement result (step S740). More specifically, the UE searches for a cell at a frequency having a higher priority than the serving frequency. If no suitable cell is found, the UE searches for a best-ranked cell at a frequency having the same priority as the serving frequency. If no suitable cell is found, the UE searches for an optimal cell at a frequency having a lower priority than the serving frequency.

If a new cell for cell reselection is found, the UE reselects the cell (steps S750 and S760).

If the UE camped on the CSG cell reselects a non-CSG cell of the corresponding frequency, the UE withdraws the assumption on the implicit highest priority of the CSG cell, and uses a frequency priority value delivered by the network in a cell reselection evaluation process.

If the UE finds another best-ranked CSG cell at a frequency having the same frequency priority when the UE is camped on the CSG cell, whether the UE will reselect the CSG cell or will stay in the CSG cell on which the UE is currently being camped on is determined based on an implementation of the UE.

Now, a PCI in 3GPP LTE will be described.

Figure 8:
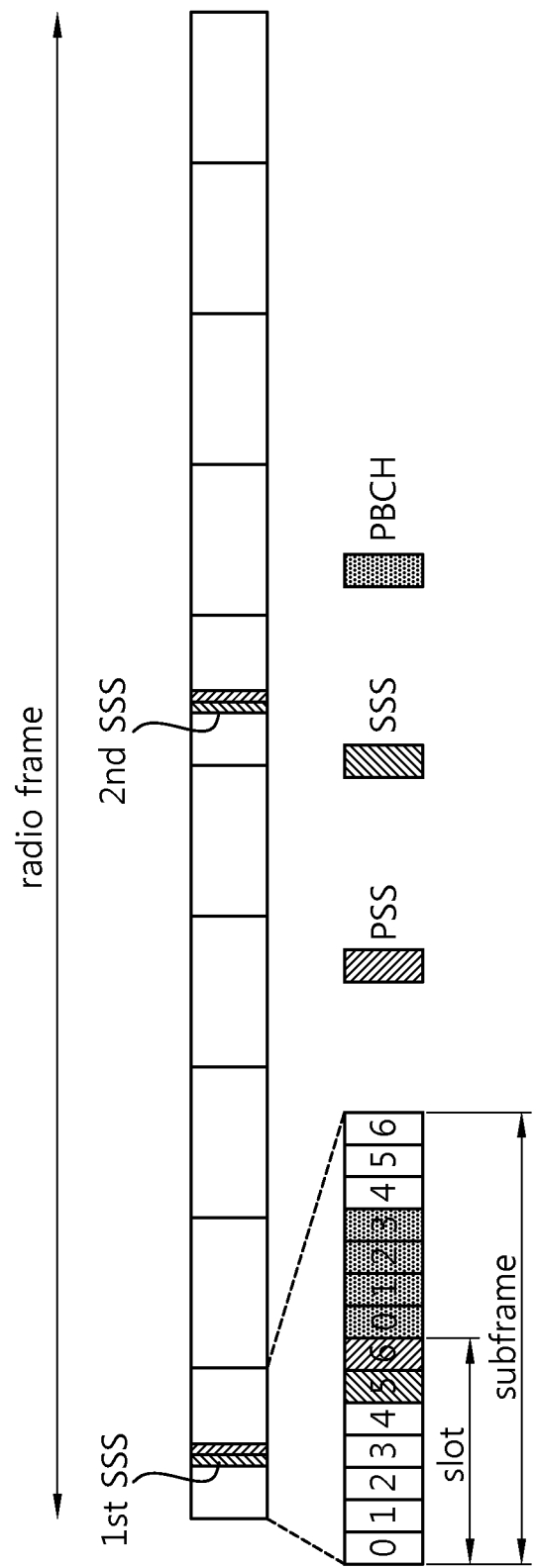
FIG. 8 shows a radio frame structure in $3^{rd}$ generation partnership project (3GPP) long term evolution (LTE).

FIG. 8 shows a radio frame structure in the 3GPP LTE. The section 6 of 3GPP TS 36.211 V8.7.0 (2009-05) "Evolved Universal Terrestrial Radio Access (E-UTRA); Physical Channels and Modulation (Release 8)" may be incorporated herein by reference.

A radio frame includes 10 subframes. One subframe includes 2 slots. One slot may include a plurality of orthogonal frequency division multiplexing (OFDM) symbols in time domain. Since the 3GPP LTE uses orthogonal frequency division multiple access (OFDMA) in a downlink, the OFDM symbol is only for expressing one symbol period in the time domain, and is not limited by terms or multiple access mechanisms. For example, the OFDM symbol may also be referred to as another term such as a single carrier frequency division multiple access (SC-FDMA) symbol, a symbol period, etc.

A physical broadcast channel (PBCH) is transmitted in first four OFDM symbols in a 2nd slot of a 1st subframe. The PBCH carries system information necessary for communication between a UE and a BS. The system information transmitted through the PBCH is referred to as a master information block (MIB). In comparison thereto, system information transmitted through a physical downlink control channel (PDCCH) is referred to as a system information block (SIB).

A primary synchronization signal (PSS) is transmitted in last OFDM symbols of a 1st slot, i.e., a 1st slot of a 1st subframe (a subframe indexed with 0), and an 11th slot, i.e., a 1st slot of a 6th subframe (a subframe indexed with 5). The PSS is used to acquire OFDM symbol synchronization or slot synchronization, and is in association with a physical cell identify. A primary synchronization code (PSC) is a sequence used for the PSS. There are three PSCs in the 3GPP LTE. One of the three PSCs is transmitted using the PSS according to a cell ID. The same PSC is used for each of the last OFDM symbols of the 1st slot and the 11th slot.

A secondary synchronization signal (SSS) includes a 1st SSS and a 2nd SSS. The 1st SSS and the 2nd SSS are transmitted in an OFDM symbol adjacent to an OFDM symbol in which the PSS is transmitted. The SSS is used to attain frame synchronization. The SSS is used to acquire a cell ID together with the PSS. The 1st SSS and the 2nd SSS use different secondary synchronization codes (SSCs). If the 1st SSS and the 2nd SSS each include 31 subcarriers, sequences of two SSCs with a length of 31 are respectively used for the 1st SSS and the 2nd SSS.

A PCI is acquired by receiving the PSS and the SSS. The PCI $N^{cell}_{ID}$ can be obtained from $N^{cell}_{ID}=3N^{(1)}_{ID}+N^{(2)}_{ID}$. A PCI group $N^{(1)}_{ID}$ is in the range from 0 to 167, and is acquired by using the SSS. An identity $N^{(2)}_{ID}$ in the PCI group is in the range from 0 to 2, and is acquired by using the PSS. Therefore, there are 504 unique PCIs in the 3GPP LTE.

Now, inbound mobility will be described. The inbound mobility is a handover from a macro cell to a CSG cell.

The handover from the macro cell to the CSG cell has two issues to be considered in comparison with a handover from one macro cell to another macro cell. The first issue is PCI confusion, and the second issue is preliminary access check.

The PCI confusion is caused when one or more CSG cells and/or macro cells share the same PCI due to PCI shortage in a case where many CSG cells are installed. For example, the number of PCIs is limited to 504 in the 3GPP LTE. When there are only macro cells, a small number of macro cells exist in a limited area and thus the PCIs can be assigned to the respective macro cells without overlapping. However, when one or more CSG cells are additionally deployed in the limited area, the conventional number of PCIs may not be enough to assign different PCIs to all cells. In addition, since the CSG cells can be deployed in any places unlike the macro cells, the network may not be able to manage the PCI.

Figure 9:
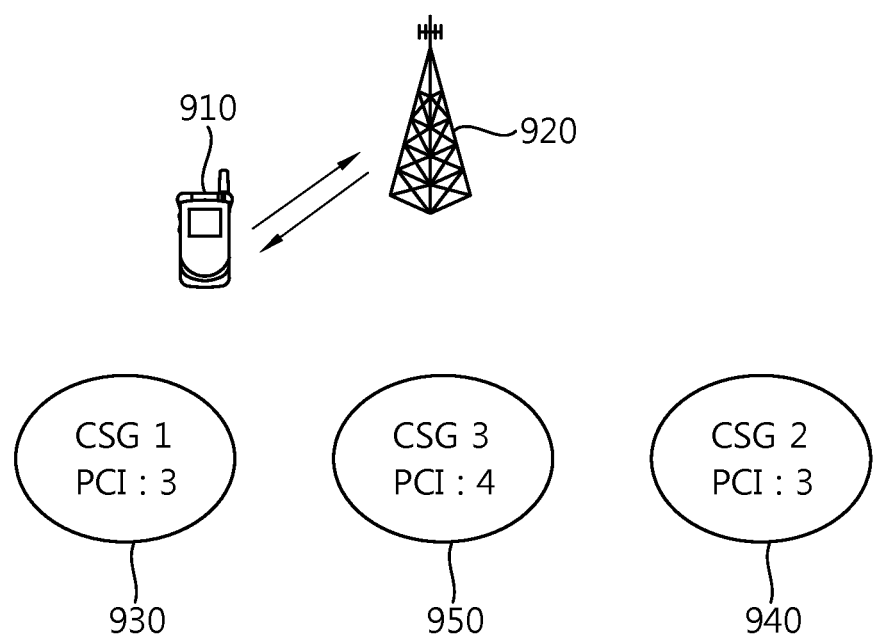
FIG. 9 shows an example of physical cell identity (PCI) confusion.

FIG. 9 shows an example of PCI confusion.

A UE 910 is in connection with a macro cell 920, and the macro cell 920 is a serving cell. It is assumed herein that a PCI of a CSG1 930 is 3, a PCI of a CSG2 940 is 3, and a PCI of a CSG3 950 is 4.

It is also assumed that the CSG1 930 has the best signal quality and thus the UE 910 desires to perform a handover to the CSG1 930. The UE 910 sends a measurement report message to the macro cell 920 by inserting the PCI of the CSG1 930 to the measurement report message.

However, since there is the CSG2 940 of which the PCI is 3, it becomes unclear to which CSG cell the macro cell 920 will send a handover request. This is referred to as PCI confusion. If the macro cell 920 sends the handover request to the CSG2 940 other than the CSG1 930 desired by the UE 910, the handover may fail and service quality of the UE may deteriorate.

The PCI confusion occurs when a cell is identified by using only a limited number of PCIs. To solve the PCI confusion, a global cell identity may be used. This is referred to as a cell global ID (CGI). Unlike the PCI attained through a PSS and an SSS, i.e., synchronization signals, the CGI is acquired by the UE through system information (e.g., MIB and SIB) received after a downlink synchronization is established. The CGI is a unique identity of each cell in the network.

The preliminary access check implies a process of pre-recognizing whether a CSG cell to which the UE intends to move is a member cell or a non-member cell before the UE performs the handover.

The reason above is that, even if whether to perform the handover is generally determined based on signal quality of neighboring cells, the handover is possible only when a target CSG cell of the UE is the CSG member if the target cell to which the UE intends to move is the CSG cell.

The UE has a CSG white list, but the CSG cell does not have a list of accessible UEs. Therefore, the UE needs to attain a CSG ID of the CSG cell before the handover is performed, so as to determine whether the UE is a member or a non-member. This is referred to as the preliminary access check.

Figure 10:
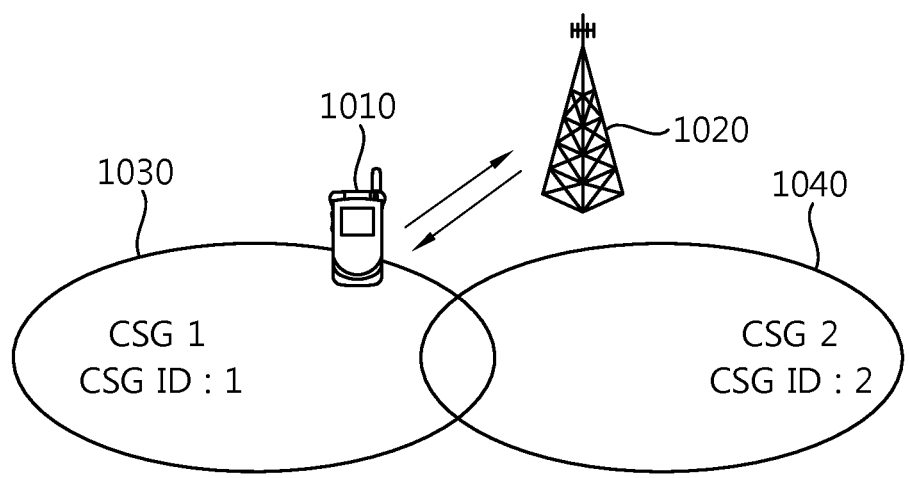
FIG. 10 shows a situation requiring preliminary access check.

FIG. 10 shows a situation requiring the preliminary access check.

A UE 1010 is in connection with a macro cell 1020, and the macro cell 1020 is a serving cell. It is assumed herein that a CSG ID of a CSG1 1030 is 1 and a CSG ID of a CSG2 1040 is 2.

A CSG white list of the UE includes the CSG IDs 2 and 3. That is, the UE is a member of a CSG cell of which a CSG ID is 2 or 3.

Assume that the CSG1 1030 has the best signal quality. Therefore, when whether to perform a handover is determined only with signal quality, the UE 1010 requests the macro cell 1020 to perform a handover to the CSG1 1030. Then, the UE 1010 establishes a connection to the CSG1 1030 according to a handover command of the macro cell 1020. However, since the UE 1010 is not a CSG member of the CSG1 1030, access is denied. Therefore, the UE 1010 attempts cell selection or a handover to another cell, which leads to service delay.

As described above, in order to reduce a handover failure rate, the inbound mobility needs to consider the PCI confusion and the preliminary access check unlike in the conventional handover process.

Now, the proposed inbound mobility will be described.

Figure 11:
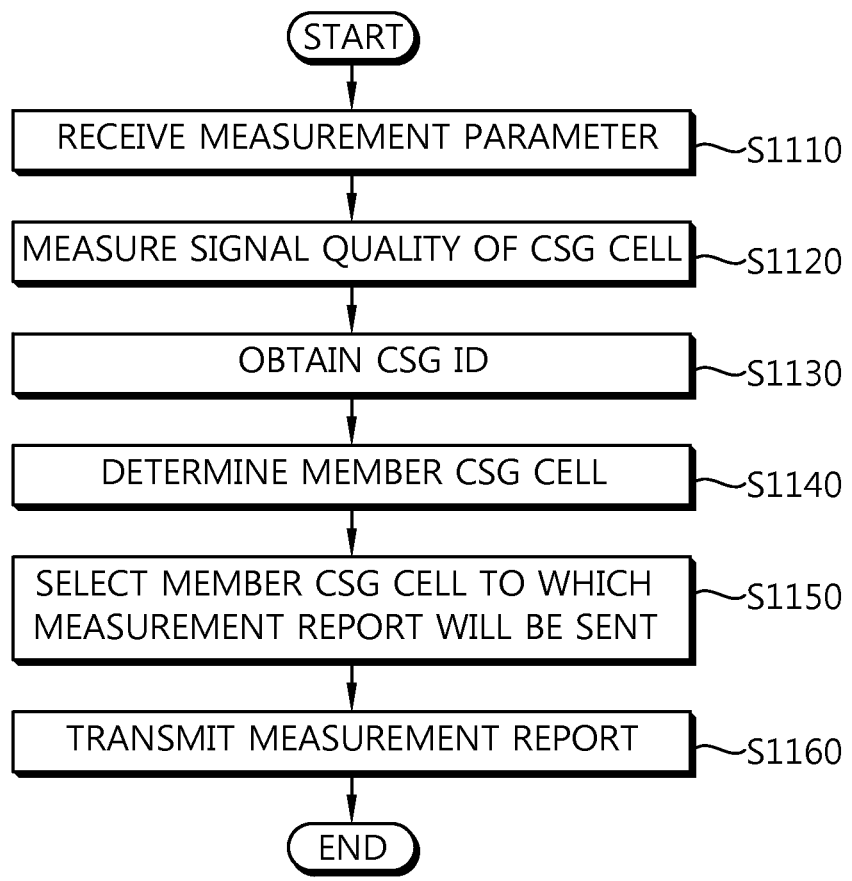
FIG. 11 is a flowchart showing a measurement report method according to an embodiment of the present invention.

FIG. 11 is a flowchart showing a measurement report method according to an embodiment of the present invention. This procedure can be performed by a UE.

The UE receives a measurement parameter for measuring CSG cells from a serving cell (step S1110). The UE may receive the measurement parameter for measuring the CSG cells separately or together with a measurement parameter for macro cells.

Before or after receiving the measurement parameter, the UE may send proxy information to the serving cell. The proxy information is information for reporting that the UE previously performs a connection or handover to a corresponding CSG cell.

The UE measures signal quality of the CSG cells on the basis of the measurement parameter (step S1120).

The UE obtains CSG IDs of the CSG cells by using system information of the CSG cells (step S1130). If the UE visited CSG cells previously and system information of the CSG cells which is stored in the UE is still valid, the UE may utilize the stored system information to obtain the CSG IDs. The CSG ID can be obtained by using the system information of the CSG cells. As shown in the flowchart of FIG. 6, the UE may check for a connection mode of the cell and the CSG ID by using the system information.

The UE may obtain the CSG ID after receiving a preliminary report request for requesting attainment of the system information of the CSG cell from the serving cell.

The UE determines member CSG cells having the UE as a member thereof among the CSG cells on the basis of the CSG IDs of the CSG cells (step S1140). The member CSG cell is a cell having the UE as a member thereof among the CSG cells. Since the UE has a CSG white list, member CSG cells can be identified from the CSG IDs.

If there is at least one member CSG cell among the CSG cells, the UE selects the member CSG cell which is included in a measurement report (step S1150). If there is a plurality of member CSG cells, the UE may select the cell according to signal quality of the CSG cells. For example, among the member CSG cells, a cell having the best signal quality may be selected.

The UE transmits the measurement report including information on the selected member CSG cell to the serving cell (step S1160). The information may include at least one of the signal quality, CSG ID, a CSG membership and CGI of the selected CSG cell.

The serving cell may determine whether to perform a handover to the member CSG cell of the UE on the basis of the measurement report.

According to the aforementioned embodiment, the CGI is included in the measurement report to solve the PCI confusion problem. In addition, the UE reports a measurement result of CSG cells having the UE as a member thereof, thereby performing the preliminary access check. Therefore, a handover failure rate can be reduced, and service quality of the UE can be improved.

Now, the proposed inbound mobility will be described by taking a further detailed example.

Figure 12:
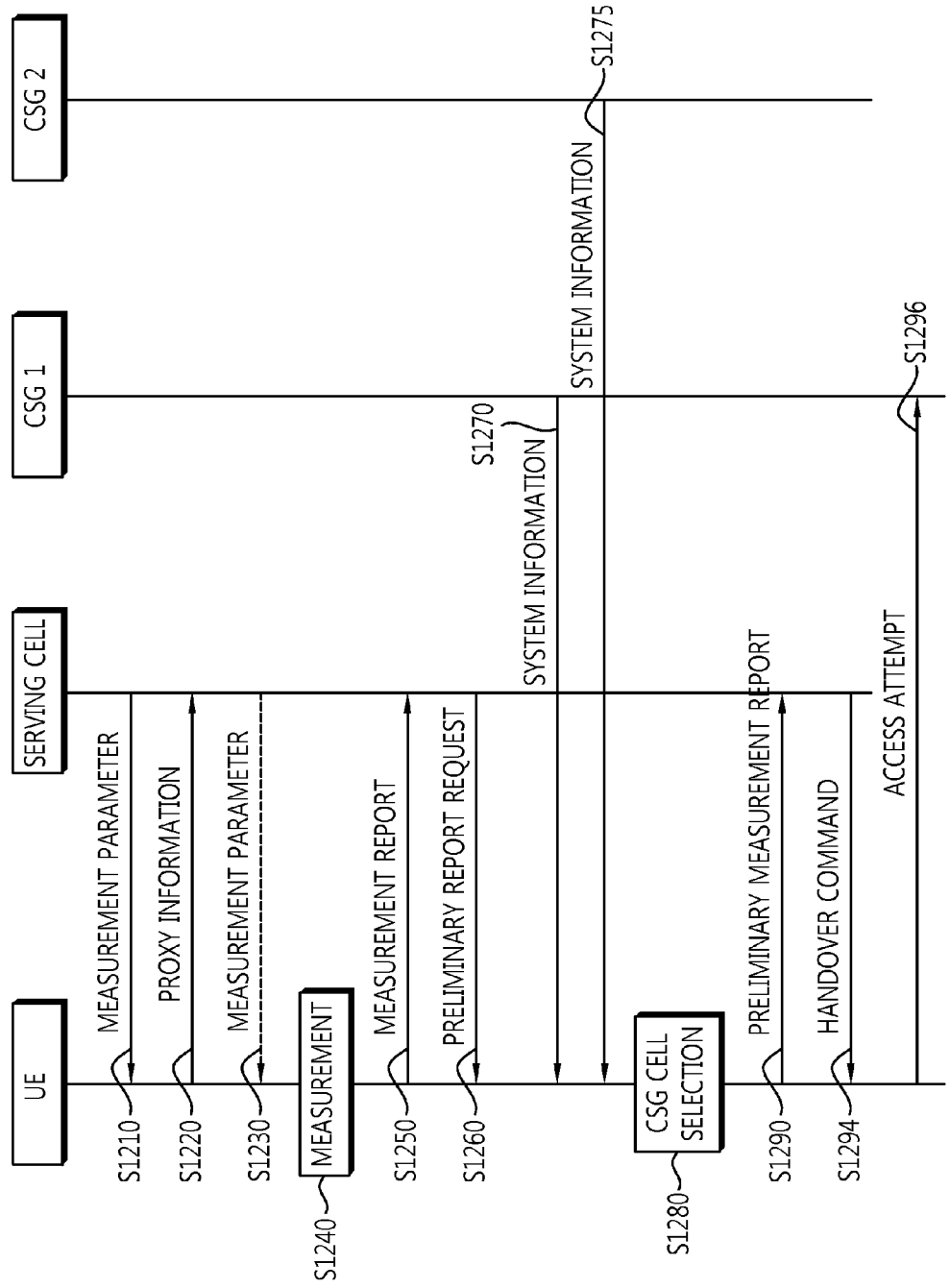
FIG. 12 is a flowchart showing a handover procedure according to an embodiment of the present invention.

FIG. 12 is a flowchart showing a handover procedure according to an embodiment of the present invention.

A UE receives a measurement parameter required for measurement from a serving cell (step S1210). The parameter is a typical measurement parameter required for measurement without distinction of a macro cell and a CSG cell.

The UE recognizes that there are neighboring CSG cells, and sends proxy information of the corresponding CSG cells to the serving cell (step S1220).

If the CSG cell uses a different frequency from the serving cell, the serving cell sends a measurement parameter related to inter-frequency measurement to the UE (step S1230). If the CSG cell relates to intra-frequency which uses the same frequency as the serving cell, the measurement parameter is not sent.

The UE measures signal quality of the neighboring cells on the basis of the measurement parameter received from the serving cell (step S1240).

The UE reports a measurement result for the measured signal quality (step S1250).

The serving cell requests a preliminary report of the measurement object cell on the basis of the measurement result (step S1260). The preliminary report request may include an indicator by which the serving cell instructs the UE to measure the signal quality and/or to determine whether it is a member or a non-member. For example, it is assumed that the indicator has a length of 1 bit. If the indicator is '0', the UE reports the measurement result of the measurement object cell. The UE may report the measurement result for the measurement object cell having the best signal quality. If the indicator is '1', the UE may perform the following operation including the preliminary access check.

If the serving cell requests the preliminary access check at the preliminary report request, the UE obtains a CSG ID of each CSG by receiving system information of the measurement object cells, i.e. CSG1 and the CSG2 (step S1270 and step S1275). When the CSG ID is attained, the UE can determine a member CSG cell having the UE as a member thereof by comparing the CSG ID with a CSG ID included in a CSG white list.

The UE selects a CSG cell to which the measurement report is to be transmitted among the member CSG cells (step S1280). Among the plurality of member CSG cells, the UE may select a cell having the best signal quality.

Assume that the CSG1 is a member CSG cell, and the CSG2 is a non-member CSG cell. The UE sends a preliminary measurement report including information on the CSG1 to the serving cell (step S1290). The information may include the signal quality, CSG ID, a CSG membership and/or CGI of the CSG1.

A handover command for instructing a handover from the serving cell to the CSG1 is sent to the UE (step S1294).

The UE attempts access to the CSG1 (step S1296).

Figure 13:
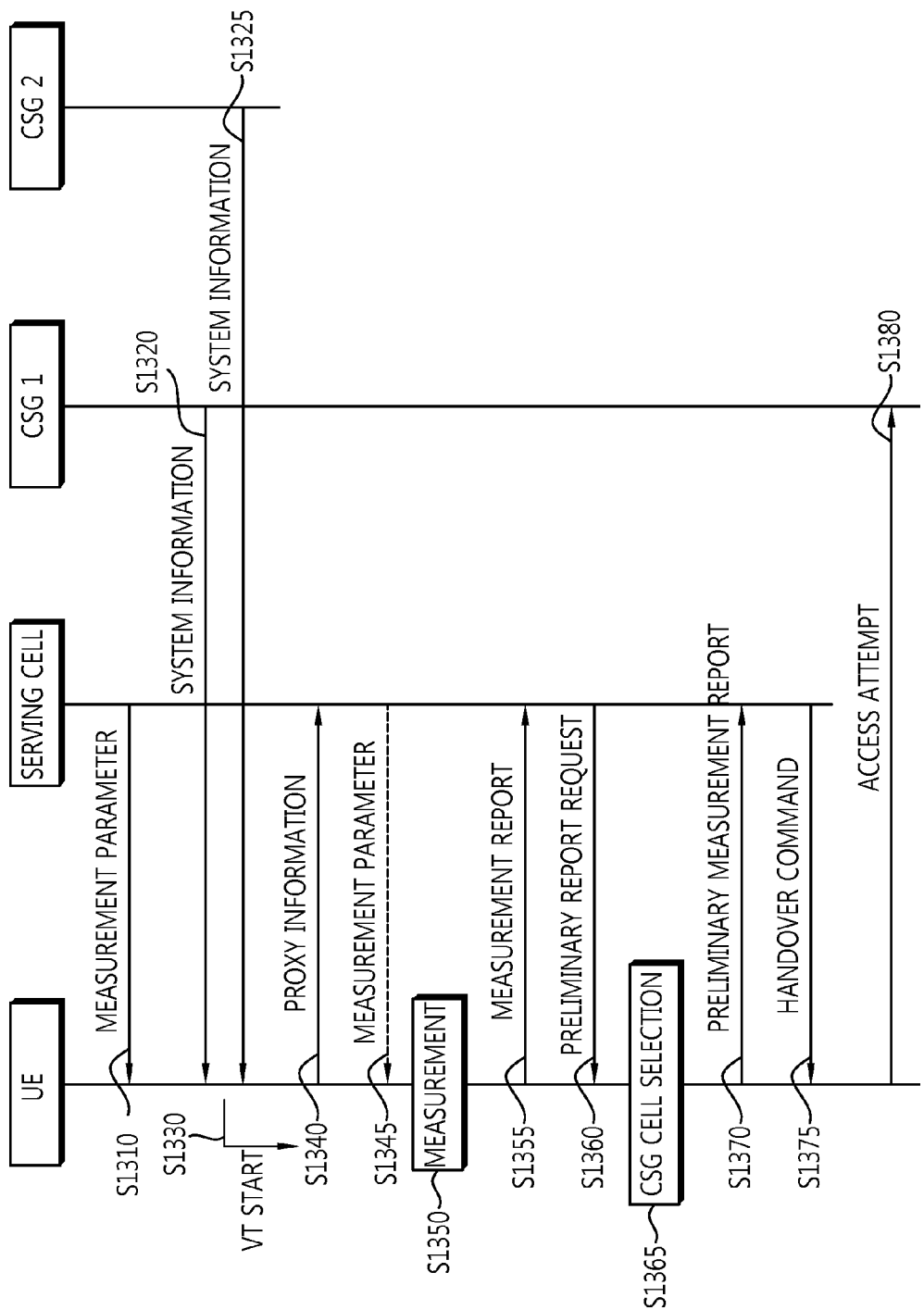
FIG. 13 is a flowchart showing a handover procedure according to another embodiment of the present invention.

FIG. 13 is a flowchart showing a handover procedure according to another embodiment of the present invention.

A UE receives a measurement parameter required for measurement from a serving cell (step S1310).

The UE attains a CSG ID of each CSG by receiving system information of a CSG1 and a CSG2 (step S1320 and step S1325). When the CSG ID is attained, the UE can determine a member CSG cell having the UE as a member thereof by comparing the CSG ID with a CSG ID included in a CSG white list.

The UE starts a validity timer (VT) (step S1330). The VT is used to determine validity of the received system information of the measurement object cells (e.g. CSG cells). The VT starts or restarts after reading the system information of the measurement object cells. At the expiry of the VT, the existing system information is no longer valid, and the UE needs to newly receive the system information of the measurement object cells. A value of the VT may be reported by a BS to the UE.

The UE recognizes existence of the neighboring CSG cells, and sends proxy information on the corresponding CSG cells to the serving cell (step S1340).

If the CSG cell uses a different frequency from the serving cell, the serving cell sends a measurement parameter related to inter-frequency measurement to the UE (step S1345).

The UE measures signal quality of the neighboring cells on the basis of the measurement parameter received from the serving cell (step S1350).

The UE reports a measurement result on the measured signal quality (step S1355).

The serving cell requests the UE to send a preliminary report of the CSG cell on the basis of the measurement result (step S1360).

If the serving cell requests the preliminary access check at the preliminary report request, the UE determines a member CSG cell having the UE as a member thereof on the basis of the previously received system information of the CSG1 and the CSG2, and selects a CSG cell to which the measurement report will be transmitted among the member CSG cells (step S1365). Among the plurality of member CSG cells, the UE may select a cell having the best signal quality. In this case, the VT is running.

Assume that the CSG1 is a member CSG cell, and the CSG2 is a non-member CSG cell. The UE sends a preliminary measurement report including information on the CSG1 to the serving cell (step S1370). The information may include the signal quality, CSG ID, a CSG membership and/or CGI of the CSG1.

A handover command for instructing a handover from the serving cell to the CSG1 is sent to the UE (step S1375).

The UE attempts access to the CSG1 (step S1380).

The UE can store system information of a visited (or read) CSG cell for a specific period of time. If the UE revisits the CSG cell within the specific period of time, the system information of the CSG cell can be reported to the network by using the stored system information instead of re-reading the system information. Therefore, a time for performing inbound mobility can be reduced.

Figure 14:
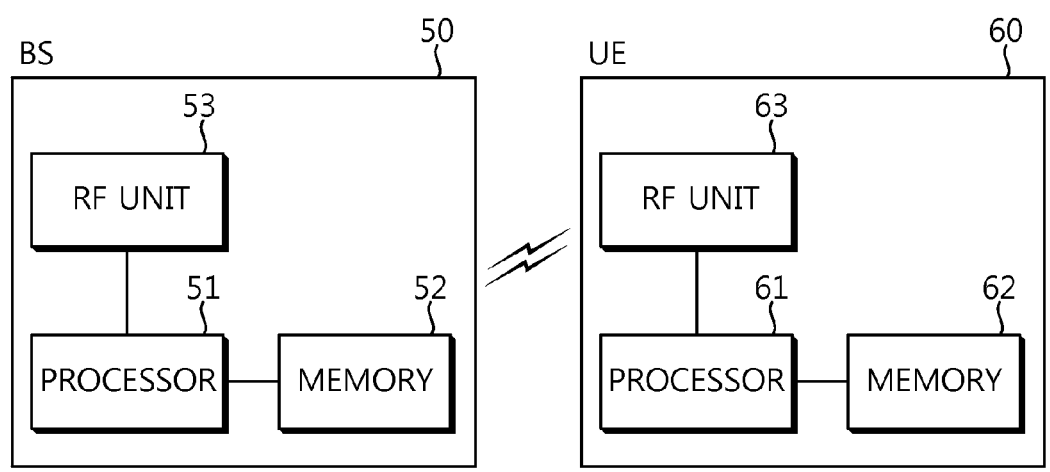
FIG. 14 is a block diagram showing a wireless communication system for implementing an embodiment of the present invention.

FIG. 14 is a block diagram showing a wireless communication system for implementing an embodiment of the present invention.

A BS 50 includes a processor 51, a memory 52, and a radio frequency (RF) unit 53. The memory 52 is operatively coupled with the processor 51 and stores a variety of information to operate the processor 51. The RF unit 53 is operatively coupled with the processor 51, and transmits and/or receives a radio signal.

The processor 51 implements the proposed functions, procedures and/or methods. Layers of the radio interface protocol may be implemented in the processor 51. The processor 51 may be configured to implement the operation of the BS in the embodiments of FIG. 12 and FIG. 13.

A UE 60 includes a processor 61, a memory 62, and an RF unit 63. The memory 62 is operatively coupled with the processor 61, and stores a variety of information to operate the processor 61. The RF unit 62 is operatively coupled with the processor 61, and transmits and/or receives a radio signal.

The processor 61 implements the proposed functions, procedures and/or methods. Layers of the radio interface protocol may be implemented in the processor 61. The processor 61 may be configured to implement the operation of the UE in the embodiments of FIG. 11 to FIG. 13.

The processors 51, 61 may include application-specific integrated circuit (ASIC), other chipset, logic circuit and/or data processing device. The memories 52, 62 may include read-only memory (ROM), random access memory (RAM), flash memory, memory card, storage medium and/or other storage device. The RF units 53, 63 may include baseband circuitry to process radio frequency signals. When the embodiments are implemented in software, the techniques described herein can be implemented with modules (e.g., procedures, functions, and so on) that perform the functions described herein. The modules can be stored in memories 52, 62 and executed by processors 51, 61. The memories 52, 62 can be implemented within the processors 51, 61 or external to the processors 51, 61 in which case those can be communicatively coupled to the processors 51, 61 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of reporting a measurement result of a user equipment in a wireless communication system, the method comprising:
    receiving a measurement parameter for measuring at least one cell from a serving cell;
    receiving system information from at least one neighbor cell, each of the system information of the at least one neighbor cell comprising a closed subscriber group (CSG) indicator indicating a type of a corresponding neighbor cell, each of the system information of the at least one CSG cell further comprising a CSG identity of a corresponding CSG cell;
    determining whether at least one Closed Subscriber Group (CSG) cell is present among the at least one neighbor cell based on the system information of the at least one neighbor cell,
    wherein, when at least one CSG indicator, indicating that the type is a CSG cell, is included in at least one piece of the system information of the at least one neighbor cell, it is determined that the at least one CSG cell is present,
    wherein, when the at least one CSG indicator is not included in the at least one piece of the system information, the presence of the CSG cell is determined by comparing the at least one CSG ID with a white list, and
    wherein the white list indicates an accessible CSG cell list, the accessible CSG cell list including at least one CSG identity (ID) for at least one accessible CSG cell to which the user equipment is permitted to access;
    transmitting a proximity indication on the at least one CSG cell to the serving cell, when it is determined that the at least one CSG cell is present;
    measuring the at least one CSG cell based on the measurement parameter;
    receiving a preliminary access check indicator from the serving cell, the preliminary access check indicator indicating whether a preliminary access check is requested,
    wherein the preliminary access check indicator has a length of 1 bit,
    wherein, when the preliminary access check is requested, determining at least one member CSG cell comprising the user equipment as a member thereof from at least one CSG cell based on system information of the at least one CSG cell,
    selecting a target member CSG cell among the at least one member CSG cell for transmitting a measurement report for the target member CSG cell,
    transmitting the measurement report to the serving cell, the measurement report comprising signal quality for the target member CSG cell,
    receiving a handover command from the serving cell, the handover command being used to instruct the user equipment for performing the handover from the serving cell to the target member CSG cell, and
    accessing to the target member CSG cell after receiving the handover command,
    wherein the each of the system information of the at least one CSG cell is stored for a specific period of time, such that the stored system information is re-used when the user equipment re-enters the at least one CSG cell within the specific period of time.

2. The method of claim 1, wherein the measurement report further comprises a cell ID of the target member CSG cell.

3. The method of claim 2, wherein the cell ID is not a physical cell identity (PCI) of the target member CSG cell.

4. The method of claim 3, wherein the cell ID is acquired from system information of the target member CSG cell.

5. The method of claim 1, wherein the selecting of the member CSG cell comprises selecting a member CSG cell having a best signal quality as the target member CSG cell.

6. The method of claim 1, wherein the measurement report further comprises a CSG ID of the target member CSG cell.

7. A user equipment for reporting a measurement result in a wireless communication system, the user equipment comprising:
    a radio frequency (RF) unit configured to transmit and receive a radio signal; and
    a processor coupled to the RF unit and configured to:
    receive a measurement parameter for measuring at least one cell from a serving cell;
    receive system information from at least one neighbor cell, each of the system information of the at least one neighbor cell comprising a closed subscriber group (CSG) indicator indicating a type of a corresponding neighbor cell, each of the system information of the at least one CSG cell further comprising a CSG identity of a corresponding CSG cell;
    determine whether at least one Closed Subscriber Group (CSG) cell is present among the at least one neighbor cell based on the system information of the at least one neighbor cell,
    wherein, when at least one CSG indicator, indicating that the type is a CSG cell, is included in at least one piece of the system information of the at least one neighbor cell, it is determined that the at least one CSG cell is present,
    wherein, when the at least one CSG indicator is not included in the at least one piece of the system information, the presence of the CSG cell is determined by comparing the at least one CSG ID with a white list, and
    wherein the white list indicates an accessible CSG cell list, the accessible CSG cell list including at least one CSG identity (ID) for at least one accessible CSG cell to which the user equipment is permitted to access;
    transmit a proximity indication on the at least one CSG cell to the serving cell, when it is determined that the at least one CSG cell is present;
    measure the at least one CSG cell based on the measurement parameter;
    receive a preliminary access check indicator from the serving cell, the preliminary access check indicator indicating whether a preliminary access check is requested,
    wherein the preliminary access check indicator has a length of 1 bit,
    wherein, when the preliminary access check is requested, determine at least one member CSG cell comprising the user equipment as a member thereof from at least one CSG cell based on system information of the at least one CSG cell,
    select a target member CSG cell among the at least one member CSG cell for transmitting a measurement report for the target member CSG cell,
    transmit the measurement report to the serving cell, the measurement report comprising signal quality for the target member CSG cell,
    receive a handover command from the serving cell, the handover command being used to instruct the user equipment for performing the handover from the serving cell to the target member CSG cell, and
    access to the target member CSG cell after receiving the handover command, wherein the each of the system information of the at least one CSG cell is stored for a specific period of time, such that the stored system information is re-used when the user equipment re-enters the at least one CSG cell within the specific period of time.

8. The user equipment of claim 7, wherein the measurement report further comprises a cell ID of the target member CSG cell.

9. The user equipment of claim 7, wherein the selecting the target member cell includes selecting a member CSG cell having best signal quality as the target member CSG cell.

10. The user equipment of claim 7, wherein the measurement report further comprises a CSG ID of the target member CSG cell.

* * * * *